United States Patent [19]

Talbott

[11] 4,270,471
[45] Jun. 2, 1981

[54] MANUALLY PROPELLED APPARATUS FOR USE IN TRANSPLANTING CROPS

[76] Inventor: Gene B. Talbott, Box 173-D, Rte. 1, Banks, Oreg. 97106

[21] Appl. No.: 25,867

[22] Filed: Apr. 2, 1979

[51] Int. Cl.³ .................... A01C 23/02; A01C 11/02
[52] U.S. Cl. .................................... 111/6; 111/3; 111/4
[58] Field of Search ........................ 111/1-3, 111/6, 7, 57, 4; 47/1.5; 45/1.5

[56] References Cited

U.S. PATENT DOCUMENTS

| | | | |
|---|---|---|---|
| 2,776,633 | 1/1957 | Bible | 111/2 |
| 3,320,694 | 5/1967 | Biron | 47/1.5 |
| 4,172,537 | 10/1979 | Gandrud et al. | 111/57 |
| 4,182,247 | 1/1980 | Talbott | 111/3 |
| 4,186,671 | 2/1980 | Huang | 111/6 |

Primary Examiner—James R. Feyrer
Attorney, Agent, or Firm—Kolisch, Hartwell & Dickinson

[57] ABSTRACT

A small, light-weight apparatus for use in transplanting crops includes a vehicle operable for manual propelling in a direction of travel along the ground. A reservoir mounted on the vehicle contains a supply of liquid and a pressure source for imparting fluid pressure against the liquid contained in the reservoir is also mounted on the vehicle. Dispensers, such as nozzles are mounted on the vehicle for receiving liquid under pressure from the reservoir and for injecting liquid into the ground to form crop-receiving cavities. In addition, the apparatus includes a boom carried on the vehicle which extends generally transversely to the direction of travel, the boom spanning above the ground and providing a mounting for a plurality of the nozzles.

6 Claims, 2 Drawing Figures

4,270,471

MANUALLY PROPELLED APPARATUS FOR USE IN TRANSPLANTING CROPS

BACKGROUND AND SUMMARY OF THE INVENTION

The present invention relates to apparatus for use in transplanting crops and more particularly to a novel apparatus of generally small size which may be manually propelled over the ground for forming crop-receiving cavities by means of injecting a liquid into the ground.

In the growing of row crops, such as celery, cucumbers, tomatoes, squash, lettuce, etc., by transplanting, it is generally the practice to form a trench or other type of hole in the ground soil and then place a seedling therewithin. Various types of apparatus have been developed for mechanically digging a trench or hole and placing a seedling therewithin. Soil is then mechanically packed around the seedling to fill the hole. However, such apparatus generally are large and bulky, expensive, and are subject to mechanical breakdown. In response to the various problems associated with mechanical transplanting apparatus, applicant has developed a method and apparatus for crop transplanting which utilizes the principle of directing or injecting fluid into the ground to form crop-receiving cavities. This principle is embodied in applicant's co-pending patent application entitled "Method and Apparatus for Crop Transplanting" Ser. No. 832,686, filed Sept. 12, 1977, now U.S. Pat. No. 4,182,247.

With respect to forming crop-receiving cavities by injecting a fluid into the ground, it has been determined that such a method is particularly advantageous for farms having small acreage (in the general range of 2–30 acres). Unfortunately, such farms may not be able to support the investment necessary to undertake the purchase of larger and more complex machines as set forth in the above-mentioned patent application.

Accordingly, it is a general object of the present invention to provide a smaller-scale and light-weight apparatus for use in transplanting crops which includes a manually propelled vehicle having a reservoir means mounted thereon for containing a supply of liquid. A pressurizing means for imparting fluid pressure against the liquid contained in the reservoir means is also mountd on the vehicle. Dispensing means for receiving liquid under pressure from the reservoir means are provided for directing liquid, in the form of a jet, into the ground to form a crop receiving cavity.

Another object of the present invention is to provide an apparatus, as described above, in which the pressurizing means includes a vessel containing a fluid under pressure, such as a bottle of $CO_2$ which is commercially available. The vessel is detachably connected to the reservoir means and removably mounted on the vehicle.

Still another object of the present invention is to provide an apparatus, as described above, in which a boom is carried on the vehicle and extends generally transversely to the direction of travel. The boom spans across a predetermined width, and the dispensing means, which includes a plurality of spaced-apart and liquid injecting nozzles are mounted on the boom. Each of the nozzles is selectively positionable along the longitudinal axis of the boom for predetermining lateral spacing of the nozzles. Thus, as the apparatus is manually propelled over the ground, liquid may be transferred, under pressure from the reservoir means, to each of the nozzles. The nozzles are mounted to face downwardly so that liquid ejected therefrom is directed or injected into the ground to thereby "drill" or dig a crop-receiving cavity.

These and additional objects and advantages of the present invention will become more readily apparent from a consideration of the drawings and the following detailed description of the preferred embodiment.

DETAILED DESCRIPTION OF THE PREFERRED EMBODIMENT

Figure 1:
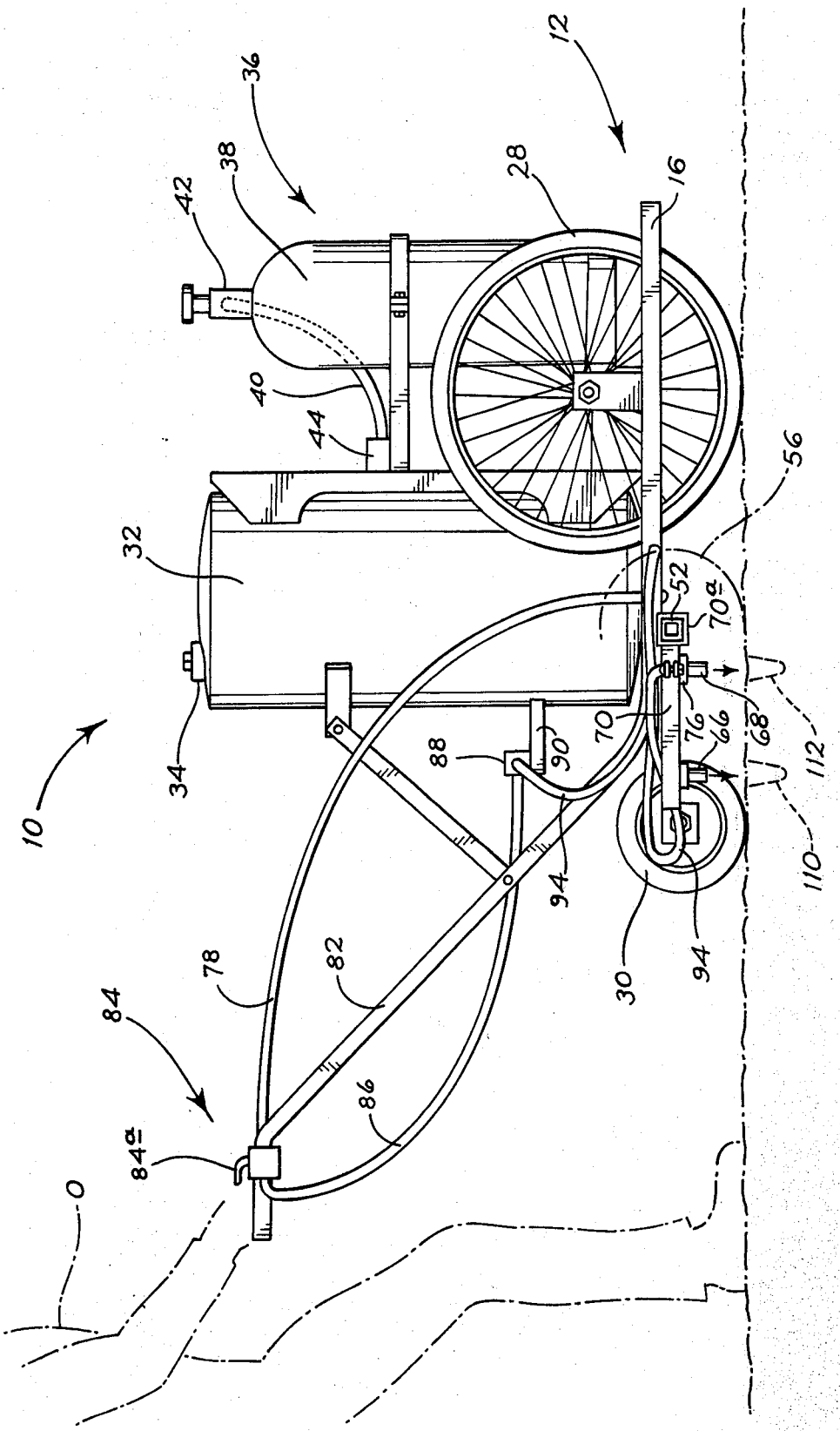
FIG. 1 is a side elevation view showing an apparatus according to the present invention positioned on the ground.

As generally outlined above, it is a general object of the present invention to provide a small, light-weight apparatus for use in transplanting which may be manually propelled by an operator. To this end, as can be seen from a consideration of FIGS. 1 and 2, an apparatus 10 is provided which includes a vehicle means, generally indicated at 12. Vehicle means 12 includes a frame formed of spaced-apart frame members 14, 16 (see FIG. 2) which are interconnected by cross members 18, 20. Additionally, another pair of frame members indicated at 22, 24 are positioned adjacent frame members 14, 16 respectively for providing support for large diameter wheels (for instance, in the range of 20-inch diameter). Extending from the rear of the frame structure is a suitably mounted trailing wheel 30 provided for supporting the frame structure substantially horizontal relative to the ground.

Considering FIG. 1, there is shown a reservoir means 32, such as a tank, mounted vertically upright on vehicle means 12 for containing a supply of liquid. Reservoir means 32 is preferably formed as a rigid tank and a filler cap or plug 34 is shown mounted on the top of the reservoir means. It is contemplated that reservoir means 32 may contain a solution of water and fertilizer for use as will be described hereinafter. Additionally, it is to be noted that the bottom of reservoir means 32 is provided with an outlet (not shown) so that fluid may be discharged outwardly therefrom.

Still considering FIG. 1, it can be seen that vehicle means 12 supports a pressurizing means generally indicated at 36. Pressurizing means 36 is provided for imparting fluid pressure against the liquid contained in reservoir means 32. Preferably, presurizing means 36 is a non-mechanized vessel, generally indicated at 38, which may be a commercially available bottle for holding a fluid pressure, such as carbon dioxide ($CO_2$) operatively connected by a tubular means, such as hose 40 to reservoir means 32. Hose 40 extends from a manually operable valve 42 mounted on top of vessel 38 and is connected to reservoir means 32 by means of a pressure regulator 44. The net effect, upon suitable actuation of valve 42, is to permit fluid under pressure to be transferred from vessel 38, via hose 40 and pressure regulator 44 into reservoir means 32 for imparting fluid pressure against the liquid contained in the reservoir means. Suitable brackets (see FIG. 2) such as indicated at 45, 46, and 48 rigidify and tie together reservoir means 32 and pressurizing means 36. Thus, it may be appreciated that pressurizing means 36 is detachably connected to reservoir means 32 and is also removably mounted on vehicle means 12.

Figure 2:
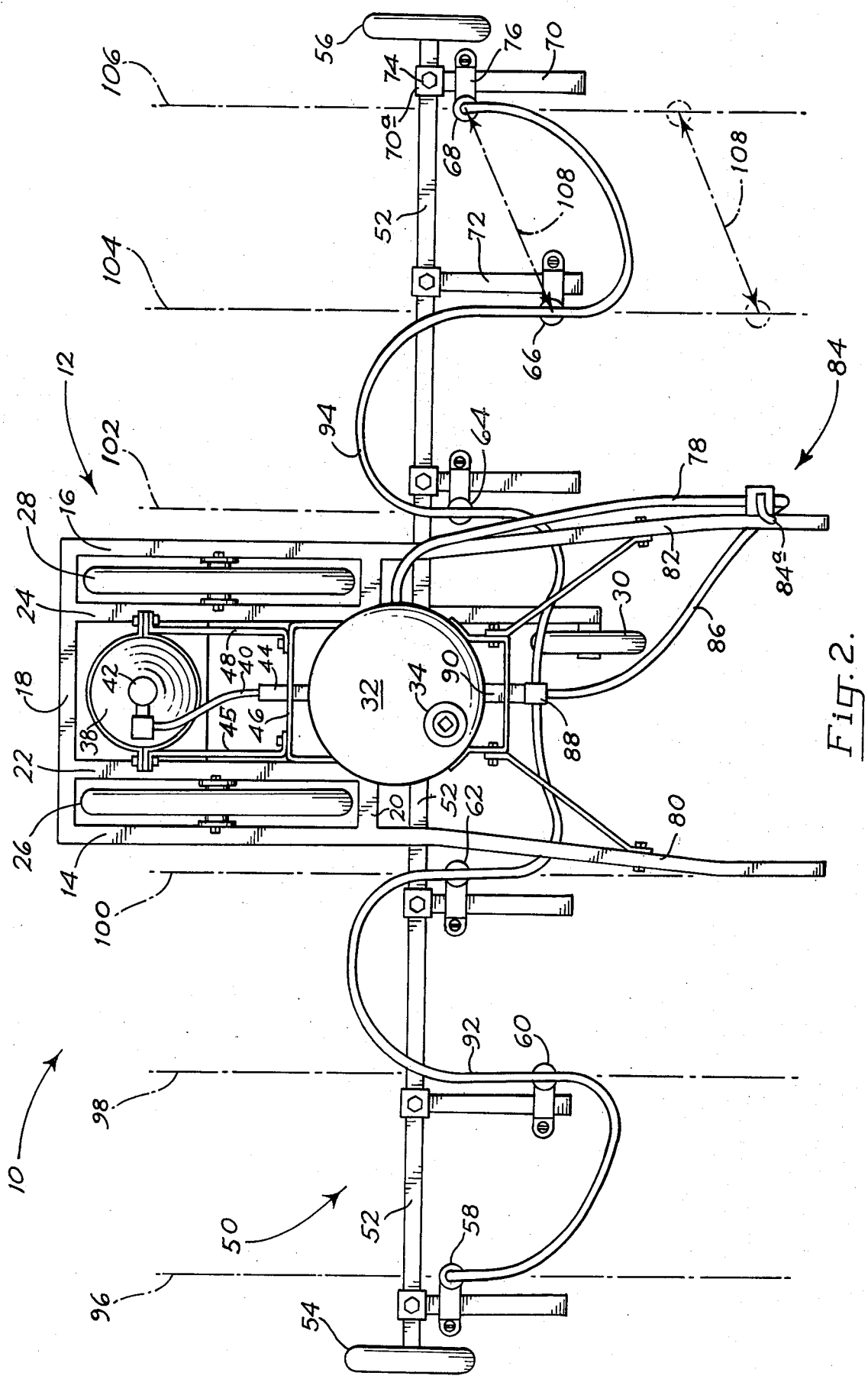
FIG. 2 is a top plan view of the apparatus shown in FIG. 1.

As can be seen from a consideration of FIG. 2, a boom means, generally indicated at 50 is carried on vehicle means 12 and extends generally transversely to the direction of travel of the vehicle means. Boom means 50 is preferably formed as an elongate boom member 52 spanning across a predetermined width above the ground. Boom member 52 may be constructed as a one piece member or in sections suitably joined to the frame structure of vehicle means 12. Additionally, boom member 52 is provided with wheels 54, 56 rotatably mounted adjacent its opposite ends. Wheels 54, 56 are engageable with the ground and are provided for maintaining boom member 52 substantially horizontally for reasons which will become apparent as this description proceeds.

It is to be noted that boom member 52 is provided for carrying dispensing means for receiving liquid under pressure from reservoir means 32 and directing or injecting the liquid into the ground to form crop-receiving cavities. For instance, as can be seen from a consideration of FIG. 2, a plurality of spaced-apart dispensing means includes nozzles such as indicated at 58, 60, 62, 64, 66, and 68 which are spaced-apart along the longitudinal axis or dimension of boom member 52. Preselected ones of the nozzles, such as nozzle 68 are carried on an adjustable means such as arm 70. Similarly, nozzle 66 is carried on arm 72. Each of the arms includes a sleeve such as sleeve 70a slidably mounted on boom member 52. Thus, the arms are selectively positionable along the longitudinal axis of boom member 52 for predetermining lateral spacing of the nozzles. Each of the arms are secured to boom member 52 by means of a clamping screw or bolt such as indicated at 74 extending through sleeve 70a for clamping against boom member 52. The arms, such as arms 70, 72, etc., are mounted on boom member 52 so as to extend generally perpendicularly thereto so as to be spaced above and longitudinally parallel with a crop row.

Further, it is to be noted that each of the nozzles, such as nozzle 68 is carried on a coupling means, such as indicated at 76 so that the nozzle may be selectively positioned along the longitudinal axis of an associated arm, such as arm 70. Coupling means 76 may take the form of a pair of opposed clamp brackets which may be selectively loosened and tightened for engaging arm 70. While not specifically shown, in another embodiment, it may be preferred that preselected ones of the nozzles are mounted directly on boom member 52 and are slidable only in the direction of the boom member's longitudinal axis.

Turning now to a consideration of how pressurized fluid is transferred from reservoir means 32 to each of the nozzles, attention is directed to FIG. 2 which illustrates provision of a tubular means, such as flexible conduit 78, extending from the bottom outlet of the reservoir means for connection adjacent a position for operator control for transferring liquid to the nozzles. Explaining further, vehicle means 12 includes a pair of laterally spaced-apart handles such as indicated at 80, 82 which extend diagonally upwardly from adjacent a rear of the vehicle means. Mounted on a gripping portion of one of the handles, such as handle 82, is a control means 84 connected to conduit 78. Extending from control means 84 is another conduit 86 which is directed into a distributor or fitting 88 which may be a T-fitting suitably mounted on a bracket such as indicated at 90 secured to reservoir means 32 or the frame of vehicle means 12.

Extending outwardly from opposite sides of coupling 88 are additional elongate, flexible hoses 92, 94 which are suitably connected by means of additional couplings or fittings to associated nozzles. For instance, conduit 94 extends outwardly from the right of fitting 88 (see FIG. 2) for transfer of liquid from reservoir means 32 to nozzles 64, 66, and 68. Thus, it can be seen that if control means 84, provided with an actuating lever 84a is actuated, liquid under pressure in reservoir means 32 will be transferred from the bottom of the reservoir means via conduits 78, 86 to conduits 92, 94 for distribution to the nozzles. The liquid is dispensed downwardly through the nozzles and injected into the soil to create crop-receiving cavities.

With respect to an operating sequence of the apparatus of the present invention, it is initially necessary to determine the actual spacing between crop rows. For instance, as can be seen in FIG. 2, six rows are shown and these are indicated at 96, 98, 100, 102, 104, and 106. Isolating rows 104, 106, it can be seen that arms 70, 72 have been suitably positioned along the longitudinal axis of boom member 52 so that nozzles 66, 68 are spaced-apart a predetermined distance. Next, if it is desired to stagger or preselect nozzle position along a respective row, nozzles 66, 68 are suitably shifted along their respective arms. For instance, as shown toward the right in FIG. 2, nozzle 66 has been shifted to a more rearward position than has nozzle 68, thus defining a diagonal distance between the nozzles, indicated in the dot-dash line at 108. This diagonal distance is greater than the distance which would occur if the nozzles were directly opposed to one another. It may be desirable to stagger the nozzles, such as shown in FIG. 2, so that a greater distance between crop-receiving cavities in adjacent rows, is provided. This may be beneficial because each transplant, placed in a crop-receiving cavity, will have more soil from which to gather nutrient.

Completing the description of the operation of apparatus 10, after nozzle spacing has been preselected, an operator, such as indicated at 0 (see FIG. 1) manually propels the apparatus until a preselected location is reached. Actuating lever 84a is depressed, and liquid under pressure is directed from the nozzles so as to be injected into the ground. The injection of the liquid "drills" or digs elongate cavities into the ground such as indicated at 110, 112. The actuating lever is then released, apparatus 10 is manually propelled to a new position along the rows and the process is repeated. In the interim, field workers have followed behind the apparatus and have inserted transplants (seedlings) into the cavities previously formed.

With respect to particular advantages of the apparatus of the present invention, note should be made that an extremely simple, trouble-free and light-weight vehicle is provided. In addition, by using a non-mechanized pressure source, such as pressurizing means 36, fluid pressure may be imparted to a stored liquid for subsequent injection in the form of a soil-pentrating jet by nozzles for forming crop-receiving cavities. An extremely simple, light-weight apparatus is provided especially suitable for small farms or even gardens. In addition, because a commercially available pressurizing means is contemplated, such as a bottle of pressurized liquid $CO_2$, pressurized fluid may be readily replaced upon depletion thereof.

In addition, the present invention provides a significant advantage in the use of boom member 52. Elaborating further, boom member 52 enables a significant stretch or span of ground to be covered so that a plurality of nozzles may be mounted thereon for farming crop-receiving cavities in a plurality of rows. As described above, an operator may simultaneously form a plurality of crop-receiving cavities on separate rows by suitably actuating control means 84 mounted on handle 82. Further, because preselected ones of the nozzles may be adjustable relative to the longitudinal axis of boom member 52, any desired preselected spacing between rows may be provided. Of course, as described above, cavities formed in adjacent rows may be staggered with respect to one another so that adequate ground soil may exist between transplants in adjacent rows.

Still another advantage of the present invention resides in the fact that boom member 52 is provided with wheels 54 56 at its opposite ends so that the boom member is maintained substantially horizontal. This is necessary so that the nozzles do not engage the ground and it is also necessary from the standpoint that the direction of liquid injection should be directed substantially vertically into the ground.

While the present invention has been particularly shown and described with reference to the foregoing preferred embodiment, it will be understood by those skilled in the art that other changes in form and detail may be made without departing from the spirit and scope of the invention as defined in the appended claims.

It is claimed and desired to secure by Letters Patent:

1. Apparatus for use in transplanting crops comprising:
   vehicle means operable for manual propelling in a direction of travel along the ground;
   reservoir means mounted on said vehicle means containing a supply of liquid;
   pressurizing means for imparting fluid pressure against the liquid contained in said reservoir means, said pressurizing means including a vessel containing a fluid under pressure, said vessel being detachably connected to said reservoir means and removably mounted on said vehicle means;
   boom means carried on said vehicle means extending generally transversly to the direction of travel, said boom means spanning above the ground;
   dispensing means mounted on said vehicle means for receiving liquid under pressure from said reservoir means and injecting the liquid into the ground to form crop-receiving cavities, said dispensing means including a plurality of spaced-apart and liquid injecting nozzles mounted on said boom means; and
   adjustable means mounted on said boom means for carrying preselected ones of said nozzles, said adjustable means being selectively positionable along the longitudinal axis of said boom means for predetermining lateral spacing of said nozzles.

2. The apparatus of claim 1 further including wheels rotatably mounted adjacent opposite ends of said boom means for engaging the ground and maintaining said boom means substantially horizontal.

3. The apparatus of claim 1 further including coupling means for mounting preselected ones of said nozzles on said adjustable means, said coupling means being shiftable along said adjustable means for preselecting nozzle position along paths generally paralleling the direction of travel.

4. The apparatus of claim 3 wherein said boom means includes an elongate member and said adjustable means includes a plurality of arms slidably mounted on said elongate member, each of said arms extending generally perpendicularly to said elongate member.

5. The apparatus of claim 1 wherein tubular means interconnect said reservoir means to each of said nozzles.

6. The apparatus of claim 5 further including handle means supported on said vehicle means for gripping by an operator, said handle means being provided with a control means mounted thereon selectively operable for transferring pressurized liquid from said reservoir means to said nozzles.

* * * * *